Oct. 26, 1971  E. K. KAUCHER  3,615,072
VALVE STRUCTURE WITH NONROTATING STEM
Filed Aug. 6, 1969
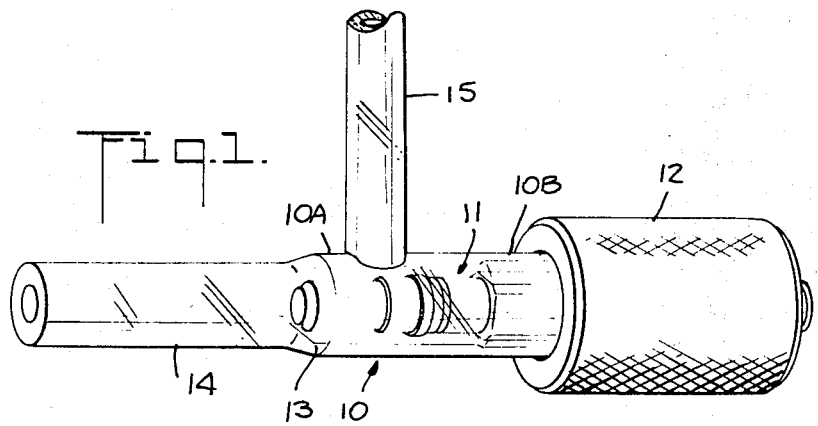
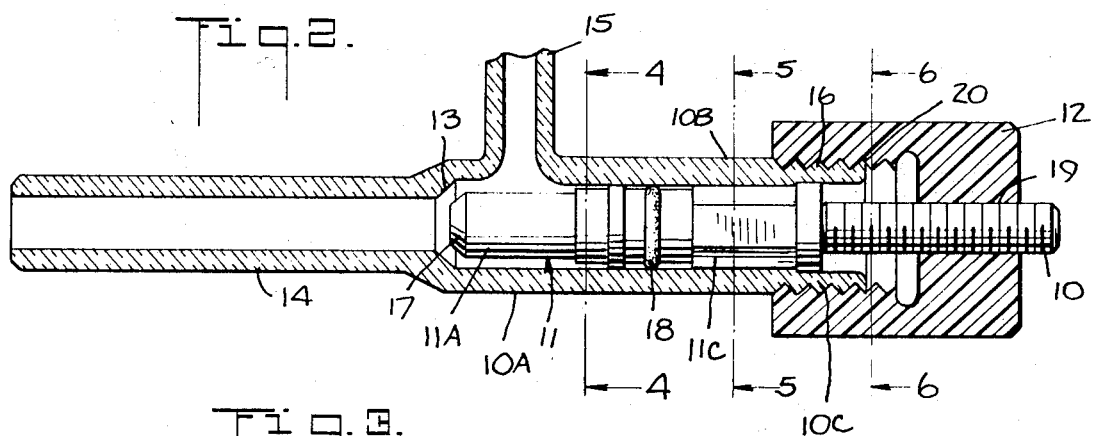
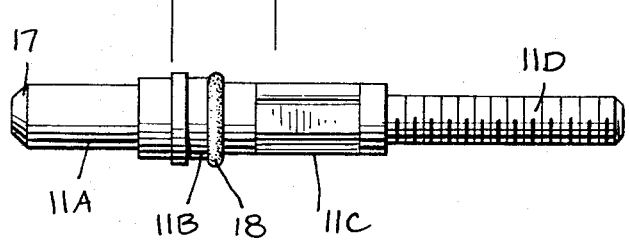
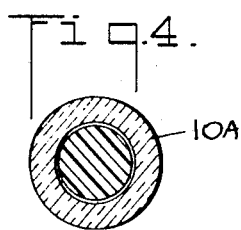
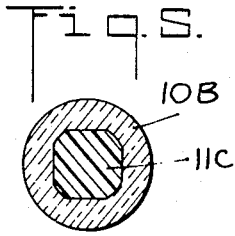
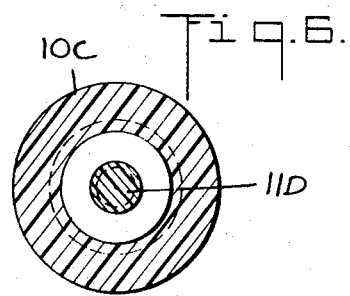
INVENTOR.
ERWIN K. KAUCHER
BY
ATTORNEY

United States Patent Office 3,615,072
Patented Oct. 26, 1971

3,615,072
VALVE STRUCTURE WITH NONROTATING STEM
Erwin K. Kaucher, Souderton, Pa., assignor to Fischer & Porter Co., Warminster, Pa.
Filed Aug. 6, 1969, Ser. No. 848,015
Int. Cl. F16k *31/50*
U.S. Cl. 251—265                           2 Claims

ABSTRACT OF THE DISCLOSURE

A valve structure for precisely controlling fluid flow, the valve including a differential thread arrangement adapted to axially shift a stem within a valve body to cause a head at the end of the stem to engage a valve seat without rotation of the stem, thereby minimizing scoring or distortion of the seat.

BACKGROUND OF THE INVENTION

This invention relates generally to valves for controlling fluid flow, and more particularly to a valve having a differential thread arrangement to shift the stem thereof axially to open and close the valve without rotation of the stem.

In a valve structure, the function of the valve is to regulate the flow of fluid passing therethrough with a predetermined pattern as the valve stem is moved by the operator to vary the net orifice or flow area. In order to fulfill this function properly, the valve body must contain the fluid without leakage, and it must have adequate capacity or flow area. Also, the valve body must resist erosion or corrosion from the fluid contained therein, and it must be fitted with a movable plug that can be positioned accurately with respect to the valve seat in accordance with the dictates of the operator.

In Pat. 3,194,533 of McLay and in the pending application Ser. No. 646,285, of Snyder, filed June 15, 1967, there are disclosed valves having a glass body, a valve seat being formed on a section of the body. Movable within the section is a plug adapted to engage the seat, the plug being coupled to a stem terminating in a handle and having an externally threaded portion which engages internal threading on the interior of the body section, whereby when the handle is turned, the stem as it rotates, also shifts axially to cause the plug to move toward or away from the valve seat, depending on the direction of rotation.

Thus when the plug is shifted into contact with the valve seat and pressure is applied thereto by turning the handle to afford an effective seal, the resultant rotation of the plug may cause scoring or distortion of the seat. Because of the torque produced by rotary motion, when the operator turns the handle to increase the pressure of the plug against the seat, with a glass body there is danger of cracking because of internal stresses produced in the glass. Hence the tendency is to apply only a modest pressure, so that in metering under vacuum, leakage may be encountered.

Moreover, valves of the above-described type lack precision in metering, for each turn of the handle results in a relatively large displacement of the plug, and it is difficult for the operator as to so adjust the net orifice of the valve to arrive at the exact value of flow desired. This is a serious drawback where the valve is intended for laboratory use or in other circumstances calling for precise valve control.

BRIEF DESCRIPTION OF INVENTION

In view of the foregoing, it is the main object of this invention to provide an improved valve structure wherein the stem is caused to move axially without rotation to bring about engagement between a plug coupled to the stem and a valve seat, without scoring or distortion.

More specifically, it is an object of the invention to provide a valve structure of the above-described type, which includes a differential thread arrangement effecting translation of the stem without rotation thereof, and which makes possible high metering precision.

A significant advantage of the invention is that the valve settings are repeatable, for the angular orientation of the non-rotatable plug and of the valve seat with respect to the axis of the valve structure remains constant during operation, and greater pressure may be applied in the axial direction to the valve seat by the plug without danger of rupture due to torque produced by rotation.

Also an object of the invention is to provide a valve structure having a transparent glass body and moving parts which are chemically inert and not subject to attack by acids or highly corrosive fluids, the glass body revealing the presence of foreign matter in the fluid flow.

Briefly stated, these objects are attained in a valve structure including a valve body wherein a valve seat is formed at one end thereof communicating with an inlet pipe. An outlet pipe is joined to the main section at a point above the valve seat. An externally-threaded terminal is formed at the other end of the valve body to define a hollow major screw having a relatively coarse pitch. Received within the valve body is a non-rotatable stem having a head at one end engageable with said valve seat, and a minor screw formed at the other end of the stem, the minor screw projecting through the hollow major screw and being coaxial therewith; the minor screw having a relatively fine pitch. Also provided is a rotary nut having a first internally-threaded bore which is adapted to engage the minor screw and a second internally-threaded bore which is adapted to engage the major screw to create a differential arrangement whereby rotation of the nut causes translation of the stem but without rotation thereof, to cause said stem head to move toward or away from the valve seat.

BRIEF DESCRIPTION OF DRAWINGS

For a better understanding of the invention, as well as other objects and further features thereof, reference is made to the following detailed description to be read in conjunction with the annexed drawings, wherein:

FIG. 1 is a perspective view of a valve structure in accordance with the invention;

FIG. 2 is a section taken longitudinally through the structure;

FIG. 3 separately illustrates the stem;

FIG. 4 is a transverse section, taken in the plane indicated by line 4—4 in FIG. 2;

FIG. 5 is a transverse section taken in the plane indicated by line 5—5 of FIG. 2; and FIG. 6 is a transverse section taken in the plane indicated by line 6—6 in FIG. 2.

DESCRIPTION OF INVENTION

Referring now to the drawings, the principal components of a valve structure in accordance with the invention, are a valve barrel or body, generally designated by numeral 10, a stem, generally designated by numeral 11, received within the body, and an operating nut 12 which engages both the body and stem. The nut, when turned, causes the stem to shift axially within the valve body.

Valve body 10 is of a transparent, high-strength material, and is preferably formed of borosilicate glass, such as Corning 7740 or Kimble KG33. Valve body 10 is cylindrical, and is constituted by a main section 10A having a bore of circular cross-section, a valve seat 13 being formed in one end of main section 10A, which seat communicates with an inlet pipe 14 integral with the main section and axially aligned therewith, the pipe being also formed of glass. Joined to main section 10A and extending laterally therefrom at a point displaced from valve seat 13, is an outlet pipe 15, also of glass.

The other end of main section 10A of the valve body joins an intermediate section 10B whose bore has a noncircular form, which, as best seen in FIG. 5, is generally square-shaped, the corners of the square being chamfered. Intermediate section 10B joins a terminal section 10C whose outer surface is threaded to define a hollow major 16 having a predetermined pitch.

Stem 11 is generally rod-like in form and preferably fabricated of tetrafluorethylene (Teflon) or other synthetic plastic material having equivalent chemical and mechanical properties, whereby the stem is chemically inert and will not react with acids or other highly corrosive materials. The stem material, while possessing a substantial degree of stiffness, has some softness or flexibility, and will therefore conform to surfaces against which it may be pressed.

Because of this characteristic and by reason of its low coefficient of friction, Teflon is admirably suited for use in a valve stem without the use of any lubricant or sealing agent under conditions where binding or sticking would be likely to occur when the valve remains exposed to chemicals through extended periods of non-use.

The front end of stem 11 constitutes a plug portion 11A terminating in a conical head 17 which conforms to the profile of valve seat 13. Plug portion 11A joins a sealing portion 11B, whose diameter is slightly less than the bore diameter of main section 10A of the valve body. A sealing ring 18 is mounted on sealing portion 11B, the ring having a slightly larger diameter than the bore, so that as the stem is shifted, the sealing ring is compressed against the wall of the main section to prevent leakage.

Sealing portion 11B joins a keeper portion 11C whose cross-sectional dimensions and profile substantially match those of the inernal bore in the intermediate section 10B of the valve body, whereby the stem is free to shift axially but not to rotate. Projecting axially from the end of the keeper portion is a minor screw 11D of reduced diameter, the minor screw extending through the hollow terminal section 10C of the valve body and being coaxial with major screw 16. The ptich of the thread of the minor screw is fine relative to that of the major screw 16.

Nut 12, which may be fabricated of Penton (chlorinated polyethers), or Kel–F (trifluorochloroethylene), or any equivalent high-strength plastic having a high resistance to chemical as well as temperature change, has its outer surface knurled to facilitate turning of the nut by an operator. Nut 12 is provided with an internally-threaded rear bore 19 of relatively small diameter, formed to engage the threads of minor screw 11D of the stem, and an internally-threaded front bore 20 of larger diameter, formed to engage the major screw 16.

When nut 12 is turned, it rotates simultaneously about the major and minor screws, the lead of the nut being greater on the major screw than on the minor screw because of the differences in the pitches thereof. In other words, a single full turn of the nut will cause the nut to advance or retract (depending on the direction of rotation) on the major screw to a greater extent than on the minor screw. Consequently, minor screw 11D, which forms a portion of stem 11, is translated axially but without rotation, by reason of the keeper portion of the valve body. For example, if the relative pitches are such that a full turn of the nut causes it to advance $\frac{1}{16}$ of an inch on the major screw, and $\frac{1}{32}$ of an inch on the minor screw, the stem will be shifted axially $\frac{1}{32}$ of an inch.

When the nut is turned to cause the head of the plug to approach the valve seat, this acts to close the valve, and when the head is pressed against the seat, it imposes a force against the glass seat. But the resultant internal stresses in the glass are minimized in that the force is imposed solely in the axial direction, no destructive torque being produced, as would happen with a rotating stem.

It will be evident that the differential thread arrangement creates a vernier action, as distinguished from a conventional rotary knob arrangement, for it takes a relatively large number of nut turns to effect the same shift that would be produced by a rotary knob connected directly to the stem. Consequently, precision metering is facilitated, and it become possible to adjust the valve opening to an exact degree. Moreover, a given nut setting to produce a desired valve opening is repeatable in that the angular orientation with respect to the axis of the valve of both the head and valve seat remains unchanged in the course of operation, and when a particular nut setting is repeated, the same valve opening is realized.

Because of the nonrotating feature and the advantages gained thereby, one may replace the Teflon plug with a harder material, such as metal or ceramic, and yet minimize the scoring of the valve body, which will otherwise occur with a rotational movement of the stem.

In the case of a conventional valve, should either the plug or the seat not be perfectly round, then a loss of registration will be experienced when rotating the plug, for while a good match may exist between the plug and seat contours at a given angular position, when rotating the plug to close the valve, a mismatch may arise. This drawback is overcome with the present invention in that the plug is displaced only in the axial direction and with continued use, the plug tends to assume a longitudinal profile which registers perfectly with that of the seat. Thus the match improves with use.

Another important advantage of the invention is that the valve may be used under high vacuum conditions without leakage. Ordinary valves tend to leak under these conditions when the vacuum approaches values of $10^{-7}$ millimeters of mercury, whereas the present valve will function without leakage under vacuum values as high as $10^{-8}$ to $10^{-9}$.

While there has been shown and described a preferred embodiment of valve structure in accordance with the invention, it will be appreciated that many changes and modifications may be made therein without, however, departing from the essential spirit of the invention.

What I claim is:

1. A valve structure for controlling the flow of fluid, said structure comprising:
   (A) a cylindrical valve body fabricated of glass and provided with a main section having a valve seat formed at one end thereof, said main section having a circular bore, an intermediate section having a generally square cross-section joined to said main section and having a non-circular bore, and a terminal section joined to said intermediate section, the terminal section being externally threaded to define a hollow major screw having a relatively coarse pitch,
   (B) an input pipe communicating with said valve seat,
   (C) an output pipe communicating with said main section at a point displaced from said seat,
   (D) a stem received within said body, said stem including a plug portion fabricated of tetrafluorethylene lying within the main section and having a head engageable with said seat, a sealing portion joined to the plug portion lying within the main section and engaging the wall of the bore thereof to seal said main section at a point displaced from the junction of the output pipe and the main section, a keeper portion lying within the intermediate section and having a matching cross-section to prevent rotation of the stem while permitting axial movement thereof, and a minor screw joined to the keeper portion and projecting through the major screw and being coaxial therewith, said minor screw having a relatively fine pitch, and (E) a nut having a bore of large diameter threadably engaging said major screw and a bore of small diameter threadably engaging said minor screw portion, whereby rotation of said nut effects translation of said stem.

2. A structure as set forth in claim 1, wherein said inlet pipe extends axially from said body and the outlet pipe extends laterally therefrom.

References Cited

UNITED STATES PATENTS

| | | | |
|---|---|---|---|
| 949,115 | 2/1910 | Davey | 251—266 |
| 1,642,412 | 9/1927 | Farnsworth | 251—265 |
| 3,040,770 | 6/1962 | Boettcher et al. | 251—368 X |
| 3,194,533 | 7/1965 | McLay | 251—368 X |

M. CARY NELSON, Primary Examiner

D. R. MATTHEWS, Assistant Examiner

U.S. Cl. X.R.

251—266, 368